United States Patent [19]
McCloskey

[11] 3,844,628
[45] Oct. 29, 1974

[54] ANTI-FRICTION BALL BEARING ASSEMBLY
[75] Inventor: Albert R. McCloskey, Fairfield, Conn.
[73] Assignee: Rockwell International Corporation, Pittsburgh, Pa.
[22] Filed: Feb. 22, 1973
[21] Appl. No.: 334,707

[52] U.S. Cl. .............................................. 308/6 C
[51] Int. Cl. .......................................... F16c 29/06
[58] Field of Search........ 308/6 C, 6 R, 195, DIG. 7

[56] References Cited
UNITED STATES PATENTS
| 3,084,004 | 4/1963 | Henley | 308/195 |
| 3,304,133 | 2/1967 | Strassberg | 308/6 C |
| 3,330,606 | 7/1967 | Suda | 308/6 C |
| 3,512,849 | 5/1970 | Weisel | 308/6 C |
| 3,540,782 | 11/1970 | Worm | 308/6 C |
| 3,545,826 | 12/1970 | Magee et al. | 308/6 C |

Primary Examiner—Charles J. Myhre
Assistant Examiner—R. H. Lazarus

[57]  ABSTRACT

An anti-friction ball bearing assembly adapted for mounting on a shaft comprising an outer sleeve and an inner sleeve concentrically fitting within said outer sleeve, the inner sleeve having a number of tracks defining paths for the circulation of balls between said sleeves and said shaft during movement between said shaft and said bearing assembly, the inner surface of the outer sleeve being provided with a number of axially extending channels adapted to receive a plurality of insertable members each having a raceway surface thereon providing bearing support for said balls during the portion of their circulation path in which said balls are in contact with said shaft and said raceway surfaces.

8 Claims, 5 Drawing Figures

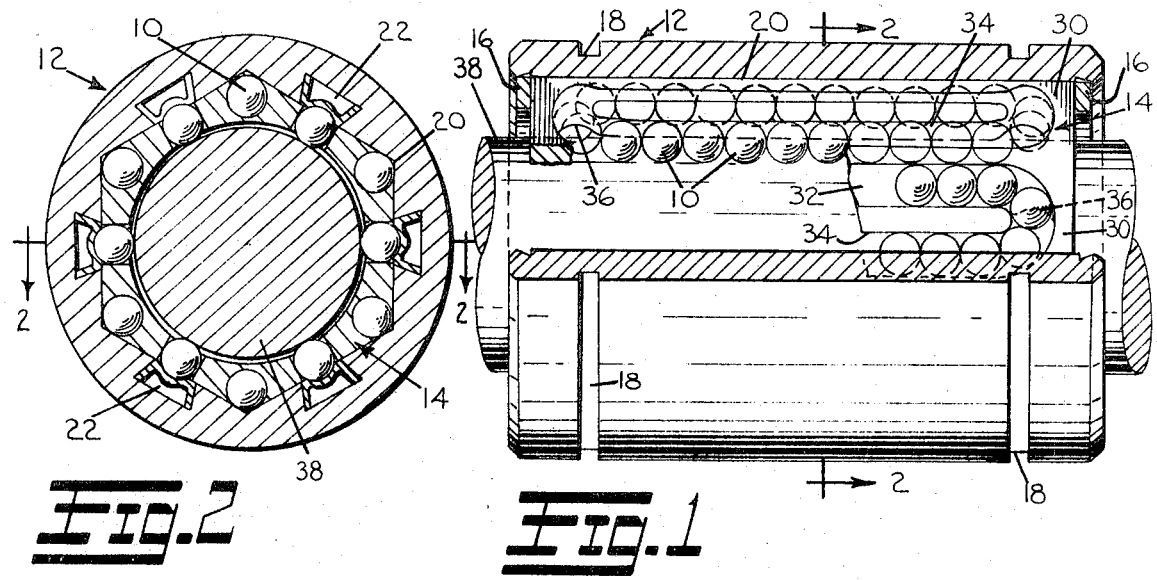
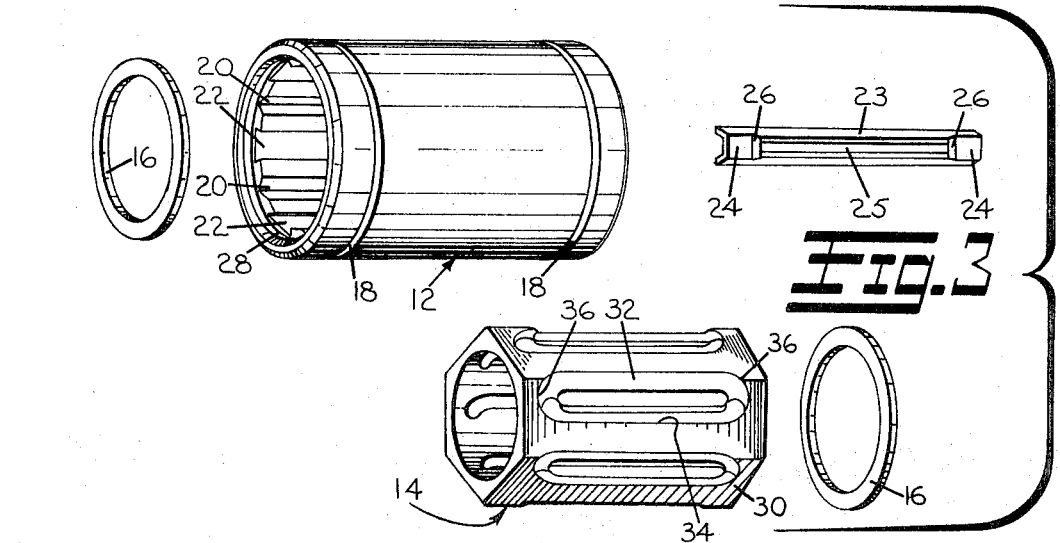
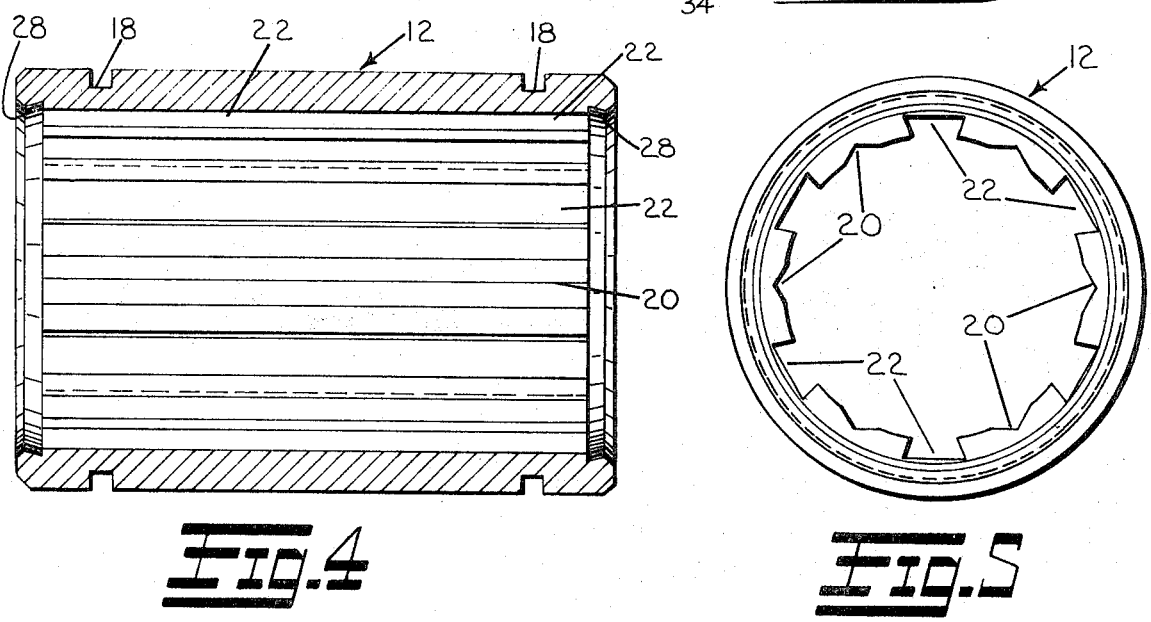

ANTI-FRICTION BALL BEARING ASSEMBLY

BACKGROUND OF THE INVENTION

This invention relates to a ball bearing assembly adapted to move longitudinally along the shaft.

In particular the invention relates to an anti-friction ball bearing assembly adapted for mounting on a shaft comprising an outer sleeve and an inner sleeve concentrically fitting within said outer sleeve, the inner sleeve having a number of tracks defining paths for the circulation of balls between said sleeves and said shaft during movement between said shaft and said bearing assembly, the inner surface of the outer sleeve being provided with a number of axially extending channels adapted to receive a plurality of insertable members each having a raceway surface thereon providing bearing support for said balls during the portion of their circulation path in which said balls are in contact with said shaft and said raceway surfaces.

The prior art is replete with many different types of recirculating ball bearing assemblies. Typically, the prior art forms of bearings are subject to high rates of wear between their respective parts. Additionally, they are intricate in design and expensive to manufacture. Premature wear may for example occur when the various bearing assembly components are manufactured slightly out of tolerance. This lack of tolerance will cause the recirculating balls to bind during operational loading. This binding will cause amount other things scoring of the balls and shaft which introduces further alignment inaccuracies and ultimate failure of the bearing assembly and possibly its associated shaft.

Accordingly, much of the prior art in this general area is directed to simplifying the various manufacturing methods and techniques to (a) improve the tolerance control between the various bearing parts, and (b) lower the cost of the anti-friction ball bearing assemblies by simplifying the manufacturing methods; both generally with only very limited success.

SUMMARY OF THE INVENTION

Accordingly, it is a primary object of the present invention to provide an anti-friction ball bearing assembly adapted for mounting on a shaft comprising an outer sleeve and an inner sleeve concentrically fitting within said outer sleeve, the inner sleeve having a number of tracks defining paths for the circulation of balls between said sleeves and said shaft during movement between said shaft and said bearing assembly, the inner surface of the outer sleeve being provided with a number of axially extending channels adapted to receive a plurality of insertable members each having a raceway surface thereon providing bearing support for said balls during the portion of their circulation path in which said balls are in contact with said shaft and said raceway surfaces.

It is another object of the present invention to provide a highly efficient ball bearing assembly capable of being inexpensively manufactured and being simplistic in design.

Another object of the present invention is to provide an anti-friction ball bearing assembly in which the raceway surfaces may be provided on stamped and machine metal parts which are inserted into channels provided in the inner surface of the outer sleeve.

It is still another object of the present invention to provide an anti-friction ball bearing assembly wherein the insertable members are entirely formed before insertion into the channels on the inner surface of the outer sleeve thereby closely controlling the tolerances of the raceway surfaces with respect to the overall anti-friction ball bearing assembly.

It is yet another object of the present invention to provide an anti-friction ball bearing assembly wherein the raceway surfaces of the insertable members are coated with a self-lubricating plastic such as polytetrafluoroethylene under highly controlled conditions.

It is yet another object of the present invention to provide an anti-friction ball bearing assembly wherein the insertable member is press fit in the channels provided on the inner surface of the outer sleeve.

It is still another object of the present invention to provide an anti-friction ball bearing assembly which can be manufactured using automated high volume techniques.

Other objects of the present invention and details of the structure of the anti-friction ball bearing assembly will appear more fully from the following description and accompanying drawings.

DESCRIPTION OF THE DRAWINGS

The accompanying drawings, referred to herein and constituting a part hereof, illustrate an embodiment of the invention, and together with the description, serve to explain the principles of the invention.

In the drawings:

FIG. 1 is a side elevation view, partially cut away, of a ball bearing assembly embodying the invention mounted on a shaft;

FIG. 2 is an end section taken along the line 2—2 of FIG. 1;

FIG. 3 is an exploded perspective view of the assembly of FIG. 1 with the anti-friction balls removed;

FIG. 4 is an enlarged side section of the outer sleeve of the bearing assembly of FIG. 1 showing inner surface details thereof;

FIG. 5 is an enlarged end view of the outer sleeve of FIG. 4.

DESCRIPTION OF THE INVENTION

Referring to the drawings, the improved anti-friction ball bearing assembly of the invention includes anti-friction bearing balls 10, and outer sleeve 12 and an inner sleeve 14 serving as a ball bearing retainer. Retaining means such as snap rings 16 are provided at each end of the assembly to anchor the inner and outer sleeves axially relative to each other to form a unit. Outer sleeve 12 may be in the form of a cylinder having a machines outer surface which is uninterrupted except for two annular grooves 18. The annular grooves 18 may be formed adjacent the ends of the outer sleeve which receive suitable retaining means, such as snap rings (not shown), to anchor the ball bearing assembly to a bushing housing or other like machine element or apparatus. Outer sleeve 12 has an inner surface formed with a plurality of axially extending grooves 20 equidistantly spaced about the inner surface circumference.

As can be seen in the various figures, there is provided axially extending channels 22 interposed between the grooves 20.

The axially extending channels 22 are adapted to receive insertable members 23. The insertable members 23 may be in the form of an inverted W-like member. The insertable member 23 is provided with raceway surfaces 25 which provide the balls 10 with a bearing surface while they are in contact with outer surface of the shaft 38 which will be later described as the bearing balls "active" position.

A recessed concave end surface 24 may be provided on the insertable member 23 adjacent each end of raceway surfaces 25. The concave end surfaces 24 are recessed with respect to raceway surfaces 22 on the insertable member 23. A smooth transition is provided between surfaces 24 and 25 by means of tapered reliefs 26. The degree of taper will vary according to among other things the degree of clearance necessary to allow the balls to track into the grooves 20. An annular groove 28 is provided at each end of the inner surface of the outer sleeve 12 to serve as a seat for a retaining ring 16 or other suitable retaining means.

Rings 16 serve to prevent axial movement of the inner sleeve with respect to the outer sleeve. They may be dished or snap rings and may be formed of metal, plastic, or other suitable material. These rings may be positioned in grooves 28 to secure the inner sleeve 14 within the outer sleeve 12, and may serve the dual purpose of also securing the insertable members 23 within the axially extending channels 22.

In place of retaining rings 16, a retaining flange or rib could be employed which may be integral with the inner sleeve at one end thereof (not shown). This rib could also be used to secure the insertable members 23 in place within the channels 22. It is also possible when using a resilient plastic material for the inner sleeve to have integrally formed thereon a retaining flange or rib at each end of the inner sleeve. A single plastic rib extension (also not shown) could also be formed on the inner sleeve 14 and engage a locating recess (not shown) formed internally in the inner surface of the outer sleeve at a position not interferring with the circulation of the ball bearings.

In FIG. 3 there is shown an inner sleeve 14 having a plurality of plane portions 30 which define a polyhedron. A plurality of balls 10 circulate along tracks formed in plane portions 30. Each track is comprised of an inner member groove 32 and a slot 34. The ends of each inner member groove 32 are curved and are interconnected by similarly curved ends of slots 34.

Slots 34 can extend completely through inner sleeve 14 and are apertured to have a width somewhat less than the diameter of bearing balls 10. Each curved end of inner member groove 32 is provided with a ramp 36 to permit the balls to enter and leave inner member grooves 32. The straight portions of the apertured slots 34 define the paths of circulation of the balls 10 while they are in their active or load bearing contact position with the shaft 38 and the concave bearing raceway surfaces 25 of the insertable members 23. Substantially frictionless relative movement is thereby achieved between the bearing assembly and shaft 38.

Axially extending grooves 20 serve to prevent rotational movement of sleeve 14 within sleeve 12 and with inner member grooves 32 define the straight portion of the track in which the balls 10 are out of contact with the shaft 38 or in their passive position. This also serves to align the axially extending slots 34 of the inner sleeve with the axially extending bearing raceway surfaces 25. As can thus be seen in the figures, the balls are in a passive state, i.e., are out of active contact with the shaft 38, where they encounter the end surface 24 on the insertable member 23. This facilitates smooth transition to and from the apertured slot 34.

There is thus provided an anti-friction ball bearing assembly in accordance with the present invention which is extremely simple in construction and design and is easy and economic to manufacture and assemble. The assembly procedure could be fully automated to further reduce the overall cost of the bearing. The bearing may be assembled by inserting the insertable member 23 within their respective axially extending channels 22 and then inserting the inner sleeve 14 within the outer sleeve 12 with the balls 10 in place. This latter step may be accomplished by registering the intersecting plane portions of the inner sleeve with the grooves 20. The fastening or snap ring 16 could be fixedly placed within their respective annular grooves 28 to lock the entire anti-friction ball bearing into an operating unit.

As above mentioned, the insertable members 23 may be inserted in their respective axially extending channels and eventually locking in operational position by the action of the fastening or snap rings 16 fixedly placed within annular grooves 28. Other means of operationally positioning the insertable member 23 within the axially extending channels 22 could also be employed, for example, an interference fit between the insertable member 23 and the walls of the channel 22 could be used to maintain the operational position of the insertable member 23.

Additionally, it will be appreciated that the various components of the bearing assembly in accordance with the present invention could be manufactured out of a wide range of materials including various types of plastics and metals. For example, the outer sleeve 12 may be manufactured from a hardenable steel such as SAE 5200 steel.

The insertable member 23 may be manufactured from a number of appropriate sheet metals, such as sheet stainless steel. The insertable member 23 could have its raceways 25 surfaces and respective recesses 24 machined thereon such as by utilizing high speed grinding machines or the like. Additionally, the raceway surfaces could be treated with a self-lubricating plastic such as polytetrafluoroethylene.

I claim:

1. An anti-friction ball bearing assembly comprising an outer sleeve and an inner sleeve concentrically fitting within said outer sleeve, said inner sleeve having a central opening for the passage of a shaft therethrough, the inner sleeve having a number of tracks defining paths for the circulation of balls between said sleeves and said shaft during relative movement between said shaft and said bearing assembly, the outer surface of the inner sleeve being polyhedronal in shape, the inner surface of the outer sleeve being provided with a number of guideways, the intersections of the plane portions defining the outer surface of the inner sleeve registering with said guideways, said inner surface of the outer sleeve is further provided with a number of axially extending channels adapted to receive a plurality of insertable members each having a concave raceway surface thereon aligned with said tracks providing a bearing support for said balls while said balls are in their loaded state.

2. An anti-friction ball bearing assembly in accordance with claim 1 wherein each of said insertable members are manufactured from sheet metal and are stamp formed.

3. An anti-friction ball bearing assembly in accordance with claim 1, wherein an annular groove is provided at each end of the inner sleeve at the inner surface thereof, said annular grooves adapted to receive fastening means, said fastening means maintaining the operational position of said insertable members.

4. An anti-friction ball bearing assembly in accordance with claim 1 wherein said raceway surfaces are coated with a selflubricating plastic material.

5. An anti-friction ball bearing assembly in accordance with claim 4 wherein said self-lubricating material is polytetrafluoroethylene.

6. An anti-friction ball bearing assembly in accordance with claim 1 wherein said insertable members are held in their operational position by an interference fit between the surface of said axially extending channels and said insertable members.

7. An anti-friction ball bearing assembly in accordance with claim 1 wherein a recessed concave end surface is provided on said insertable member adjacent each end of said raceway surface.

8. An anti-friction ball bearing assembly in accordance with claim 7 wherein a smooth transition portion is provided between each concave end surface and raceway surface.

* * * * *